US007165243B1

(12) United States Patent
Pelegri-Llopart et al.

(10) Patent No.: US 7,165,243 B1
(45) Date of Patent: Jan. 16, 2007

(54) MULTI-LINGUAL TAG EXTENSION MECHANISM

(75) Inventors: Eduardo Pelegri-Llopart, Menlo Park, CA (US); Laurence P. G. Cable, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/467,387

(22) Filed: Dec. 21, 1999

Related U.S. Application Data

(60) Provisional application No. 60/141,071, filed on Jun. 25, 1999, provisional application No. 60/149,508, filed on Aug. 17, 1999.

(51) Int. Cl.
*G06F 9/44* (2006.01)
*G06F 9/45* (2006.01)
(52) U.S. Cl. .................. 717/136; 717/115; 717/118
(58) Field of Classification Search ........ 717/114–116, 717/118, 148, 165–167, 136, 137; 715/513, 715/901, 906, 911
See application file for complete search history.

(56) References Cited

U.S. PATENT DOCUMENTS

| | | | |
|---|---|---|---|
| 5,961,586 A | | 10/1999 | Pedersen |
| 5,973,696 A | * | 10/1999 | Agranat et al. ............. 345/760 |
| 6,012,083 A | * | 1/2000 | Savitzky et al. ............ 709/202 |
| 6,035,119 A | * | 3/2000 | Massena et al. ............ 717/115 |
| 6,101,510 A | * | 8/2000 | Stone et al. ................ 715/513 |
| 6,125,402 A | | 9/2000 | Nagarajayya et al. |
| 6,470,349 B1 | * | 10/2002 | Heninger et al. ........... 717/143 |

OTHER PUBLICATIONS

"JAVASCRIPT Reference," 1997, [1997] online [accessed Jul. 28, 2003], Retrieved from Internet <URL: http://www.ctit.utwente.nl/internal/references/javascript/reference/contents.htm>, pp. 1-32.*
Andrew C. Staugaard, Jr., "Structured and Object-Oriented Techniques,"1997, Prentice-Hall, Inc., 2nd ed., pp. iii, iv, xiii, 641-666.*
Alex Fedorov, et al., "Professional Active Server pp. 2.0," 1998, Wrox Press Ltd, pp. front, i, ii, 51-173, 321-355.*
"Getting Started with ColdFusion," [online] Oct. 2, 1998, Allaire Corporation, part of "ColdFusion Documentation," Retrieved from Internet URL: http://www.macromedia.com/v1/documents/cf4/dochome.htm>, pp. 1-5.
"Developing Web Applications with ColdFusion,"[online] Oct. 2, 1998, Allaire Corporation, part of "ColdFusion Documentation," Retrieved from Internet URL:http://www.macromedia.com/v1/documents/cf4/dochome.htm>, pp. 1-44.

(Continued)

*Primary Examiner*—Tuan Dam
*Assistant Examiner*—Eric B. Kiss
(74) *Attorney, Agent, or Firm*—Dorsey & Whitney LLP

(57) ABSTRACT

A multi-lingual tag extension mechanism suitable for use with the JAVASERVER computer software Pages platform. Rather than creating a closure abstraction, the present invention "in-lines" a body evaluation for the tags. A doStart ( ) method processes a start tag and determines if a body needs to be evaluated. If so, a body evaluation buffer is passed to a doBody ( ) method for body evaluation. Once the body evaluation is complete, a doEnd ( ) method completes the processing by synchronizing the variables. The scripting details of the present invention match any nesting of the tag, so the at the structure corresponding to the original scripting is preserved. Furthermore, the present invention is not dependent on the specifics of the scripting language used to form the Web page.

16 Claims, 6 Drawing Sheets

OTHER PUBLICATIONS

"Advanced ColdFusion Development," [online] Oct. 2, 1998, Allaire Corporation, part of "ColdFusion Documentation," retrieved from Internet URL:http://www.marcomedia.com/v1/documents/cf4/dochome.htm, pp. 1-39.

"ColdFusion 4.0 Documentation Update," [online] Oct. 2, 1998, Allaire Corporation, part of "ColdFusion Documentation," Retrieved from Internet URL: http://www.macromedia.com/v1/documents/cf4/dochome.htm, pp. 1-4.

"ColdFusion Quick Reference Guide," [online] Oct. 2, 1998, Allaire Corporation, part of "ColdFusion Documentation," Retrieved from Internet URL: http://www.macromedia.com/v1/documents/cf4/dochome.htm. pp. i-iv, 1-30.

Colton, Paul, et al., "Tools for Developing Servlets and Server Pages Using Java Technology," 1999, JavaOne '99 Session Information, pp. 1-17.

Pelegri-Llopart, Eduardo, "JavaServer Pages Technology," 1999, JavaOne '99 Session Information, pp. 1-36.

"Java[tm] Technolgoy Overview," [online] 2002, Sun Microsystems, Retrieved from Internet URL: http://wwws.sun.com/software/java/overview.html, p. 1.

* cited by examiner

JSP Page

```
stuff1

<foo>
        stuff2
</foo> stuff3
``` translation

Java Code

```
class TheJSPPage { run ( request, response) {
      out.println("stuff1")

k = new Closure (stuff2)
      f = new FooImpl (k)
      f.doIt (out)

out.println("stuff3")
  }
}
```

Tag Library

```
class FooImpl {

FooImpl (Closure k) {
          this.k = k
    } doIt(Stream out) {
          k.invokeClosure(out);
          // all this is pseudo-code
          // there is no Java mechanism
          // for this
    }
}
```

Figure 4

```
b = f.doStart ( )

if (b)

repeat: Evaluate the Body b = f.doBody ( )

if (b) goto repeat f.doEnd ( )
```

Fig. 5

JSP Page

```
stuff1

<foo>
        stuff2
</foo> stuff3
```

↓ translation

Java Code

```
class TheJSPPage { run ( request, response) {
        out.println("stuff1");
        boolean b;

f = new FooImpl();
        b = f.doStart();
        if (b) {
repeat:
              stuff2;
              b=f.doBody();
              if (!b) goto repeat;
              f.doEnd();
        }
        out.println("stuff3")
  }
}
```

Tag Library

```
class FooImpl {
        // data like "out" is available via
        // methods not shown here
        doStart() {
              // stuff to do on start
        } doBody() {
              // stuff to do after a body
              // evaluation
        } doEnd() {
              // stuff to do on end
        }
}
```

Figure 6

MULTI-LINGUAL TAG EXTENSION MECHANISM

This application claims priority from U.S. Provisional Application No. 60/141,071, filed Jun. 25, 1999, entitled "JAVA SERVER PAGES SPECIFICATION"; and claims priority from U.S. Provisional Application No. 60/149,508, filed Aug. 17, 1999, entitled "JAVASERVER PAGES SPECIFICATION"; and is related to U.S. patent application Ser. No. 09/471,072 entitled "MECHANISM FOR AUTOMATIC SYNCHRONIZATION OF SCRIPTING VARIABLES", filed Dec. 21, 1999, the applications are commonly assigned to the assignee of the present invention, and the disclosures of which are herein incorporated by reference.

BACKGROUND OF THE INVENTION

1. Field of the Invention

The present invention relates generally to the field of computer software, and more particularly to a multi-lingual tag extension mechanism suitable for use with JAVASERVER computer software Pages.

2. Description of the Related Art

JAVA programming language is expressly designed for use in the distributed environment of the Internet. It was designed to have the "look and feel" of the C++ language, but it is simpler to use than C++ and enforces an object-oriented programming model. JAVA programming language can be used to create complete applications that may run on a single computer or be distributed among servers and clients in a network. It can also be used to build a small application module or applet for use as part of a Webpage. Applets make it possible for a Web page user to interact with the page. JAVASERVER computer software Pages is the JAVA programming language platform technology for building applications containing dynamic Web content such as HTML, DHTML, XHTML, and XML. A JAVASERVER computer software Page (JSP) is a text-based document that describes how to process a request to create a response. The description inter-mixes template data with some dynamic actions, taking advantage of the capabilities of the JAVA programming language platform. The template data is commonly fragments of a structured document (HTML, DHTML, XHTML or XML), and the dynamic actions can be described with scripting elements and/or server-side actiontags.

A simple example of a JSP page is shown in FIG. 2. The example shows the response page, which is intended to be a short list of the day of the month and year, at the moment the request is received by the server. The page itself contains some fixed template text, and JSP elements that are shown underlined in the figure. The underlined actions are executed on the server side. When a client makes a request, such as an HTTP request, a request object requests a response from the JAVASERVER computer software container. The first element creates a JAVA BEAN computer program named clock, of type calendar.jspCalendar. The next two elements use the Bean to display some of its properties (i.e. month and year). The output is sent to a response object which sends a response back to the client.

A JSP page is executed by a JSP container, which is installed on a Web server, or on a Web enabled application server. The JSP container delivers requests from a client to a JSP page and responses from the JSP page to the client. JSP pages may be implemented using a JSP translation or compilation phase that is performed only once, followed by a request processing phase that is performed once per request. The translation phase creates a JSP page implementation class that implements a servlet interface.

Typically, a JSP page contains declarations, fixed template data, action instances that may be nested, and scripting elements. When a request is delivered to a JSP page, all these components are used to create a response object that is then returned to the client. As with standard Web pages, JSP pages may contain "tags." In order to facilitate the construction of Web pages, standard page formatting codes, known as tags, are provided. A tag is a textual element within a document that provides instructions for formatting or other actions. For example, World Wide Web documents are set up using HTML (Hyper-Text Mark-up Language) tags which serve various functions such as controlling the styling of text and placement of graphic elements, and also providing links to interactive programs and scripts.

In standard implementations, a JSP page is translated into JAVA programming language code that runs on a server. The transformation from the JSP page into JAVA programming language code is done once, when the page is first accessed. The JAVA programming language code running on the server is activated when a request is received. In order to create a response object, certain data is passed verbatim to the response, and some actions are executed on the server side. Some of these actions are explicitly spelled out in the JSP page, and other actions are described by the semantics of the text. Thus, there are three types of code: verbatim code, scripting code from the JSP page, and code which has to be defined by the tag library. As used herein, "tags" in the JSP context will be referred to as "actions."

Ideally, a tag mechanism employed in a JSP page system would allow for actions to be defined in standard libraries. This would allow third parties to provide new actions as part of their JSP authoring tools. For example, as shown in FIG. 3, a JSP page author may use a JSP specification-compliant authoring tool to create a Web page. The vendor of the authoring tool can provide new actions via a JSP tag library, such as a tag library that supports chat room functionality. The page can then be deployed into any JSP-compliant container, such as a Web browser. The Web browser uses the same tag library information in order to run the Web page, including the desired chat room functions.

In other words, if a standard JSP tag mechanism is properly defined, vendors of tag libraries can use the standard specification to create tag libraries that are compliant with the JSP environment. Also, vendors of authoring tools can create authoring tools (and scripting languages) compliant with the specification, and vendors of Web browsers can create JSP compliant Web browsers. A Web page author can then choose the best tag library and the best authoring tool available for creating the desired Web pages. Two different Web browsers may support scripting in a completely different manner, but the same tag libraries must be supported by both in order to run the Web page.

Therefore, in order to provide the desired functionality, the JSP specification needs to define the semantics of an extensible tag mechanism that can support the following constraints:

the tag mechanism can be implemented with minimal assumptions about the page implementation (i.e. only "callability" from the page into the extension should be assumed);

minimal constraints on the page translation process are imposed;

supports tag body evaluation;

portable—a tag described in a tag library must be usable in any JSP container;

simple—a mechanism that is accessible and easy to use, both by users of the tags (JSP authors, creators of JSP authoring tools) and by authors of tags;

expressive—enable a wide range of actions; in particular:

nested actions scripting elements inside the tag body refer to scripting variables, and create and update scripting variables; and usable from different scripting languages, not just JAVA programming language.

The more powerful the tag library mechanism, however, the more difficult it is to satisfy these constraints.

Currently available commercial products do not provide the desired functionality. For example, the COLDFUSION Web application sever CFX mechanism does not provide for body evaluations. Compilation-based mechanisms, such as the LIVESOFTWARE JRUN Web application sever mechanism, make significant assumptions about the page implementation details. Also, pure translation-based methods, like XSLT need to make assumptions about the scripting language.

One prior art approach is to define the semantics of each tag through a transformation into a scripting language. The problem with this approach, however, is that the tag library author does not know the scripting language that will be used, so it is very difficult to define the transformation. A second approach relies on the concept of a "closure." In an evaluation system, a closure is a data structure that holds an expression and an environment of variable bindings in which that expression is to be evaluated. The variables may be local or global. Closures are used to represent unevaluated expressions when implementing functional programming languages with lazy evaluation.

FIG. 4 illustrates how a tag can be translated into a closure. The idea of a closure is to encapsulate a tag "body" into a software object called a closure. A closure is a procedure with some context, such that the object can evaluate itself. The closure is instantiated and passed to an implementation of the tag library. The tag library can then execute the action and determine how many times to invoke the body if, for example, the body contains a loop.

During the translation process, a tag "foo" in a JSP page (FIG. 4) is transformed into a closure. An Implementation Class (type servlet) is created, with the code associated with the "Body" of the tag corresponding to the closure (i.e. the underlined code). When a request is received, an instance of the closure is passed to the tag library. The tag library then executes the action, using a single "doIt ( )" method. The main advantage of using a closure to perform the tag action is that no special knowledge is needed in order to execute the closure. Specifically, no knowledge is required of how variables are accessed, since the closure contains the necessary context. A closure is difficult to create, however, since it is difficult to provide the requisite context. In fact, the JAVA programming language does not support the use of closures.

In view of the foregoing, there is a need for an extensible tag mechanism that can provide the desired functionality in JAVA programming language programming environment, regardless of the scripting language used to develop the JSP page (i.e. multi-lingual), and which does not use a standard closure.

SUMMARY OF THE INVENTION

In general, the present invention is a multi-lingual tag extension mechanism suitable for use with the JAVA SERVER computer software Pages platform. Rather than creating a closure abstraction, the present invention "inlines" a body evaluation for the tags (i.e. actions). A doStart ( ) method processes a start tag and determines if a body needs to be evaluated. If so, a body evaluation buffer is passed to a doBody ( ) method for body evaluation. Once the body evaluation is completed, a doEnd ( ) method completes the processing by synchronizing the variables. The scripting details of the present invention match any nesting of the tag, so that the structure corresponding to the original scripting is preserved. Furthermore, the present invention is not dependent on the specifics of the scripting language in the JSP page used to form the response.

The present invention thus enables the addition of new or custom actions, allowing the JSP "language" to be easily extended in a portable fashion. Tag libraries can be used by JSP authoring tools and can be distributed along with JSP pages to any JSP container, such as Web and application servers. The tag extension mechanism of the present invention can be used from JSP pages written using any valid scripting language, although the mechanism itself only assumes a JAVA programming language RunTime environment.

BRIEF DESCRIPTION OF THE DRAWINGS

The present invention will be readily understood by the following detailed description in conjunction with the accompanying drawings, wherein like reference numerals designate like structural elements, and in which:

FIG. 4 illustrates an implementation of a closure;

FIG. 5 illustrates an implementation of the present invention; and

FIG. 6 illustrates the code of FIG. 4 translated according to the present invention.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a multi-lingual tag extension mechanism.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, or the like. It should be remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 1:
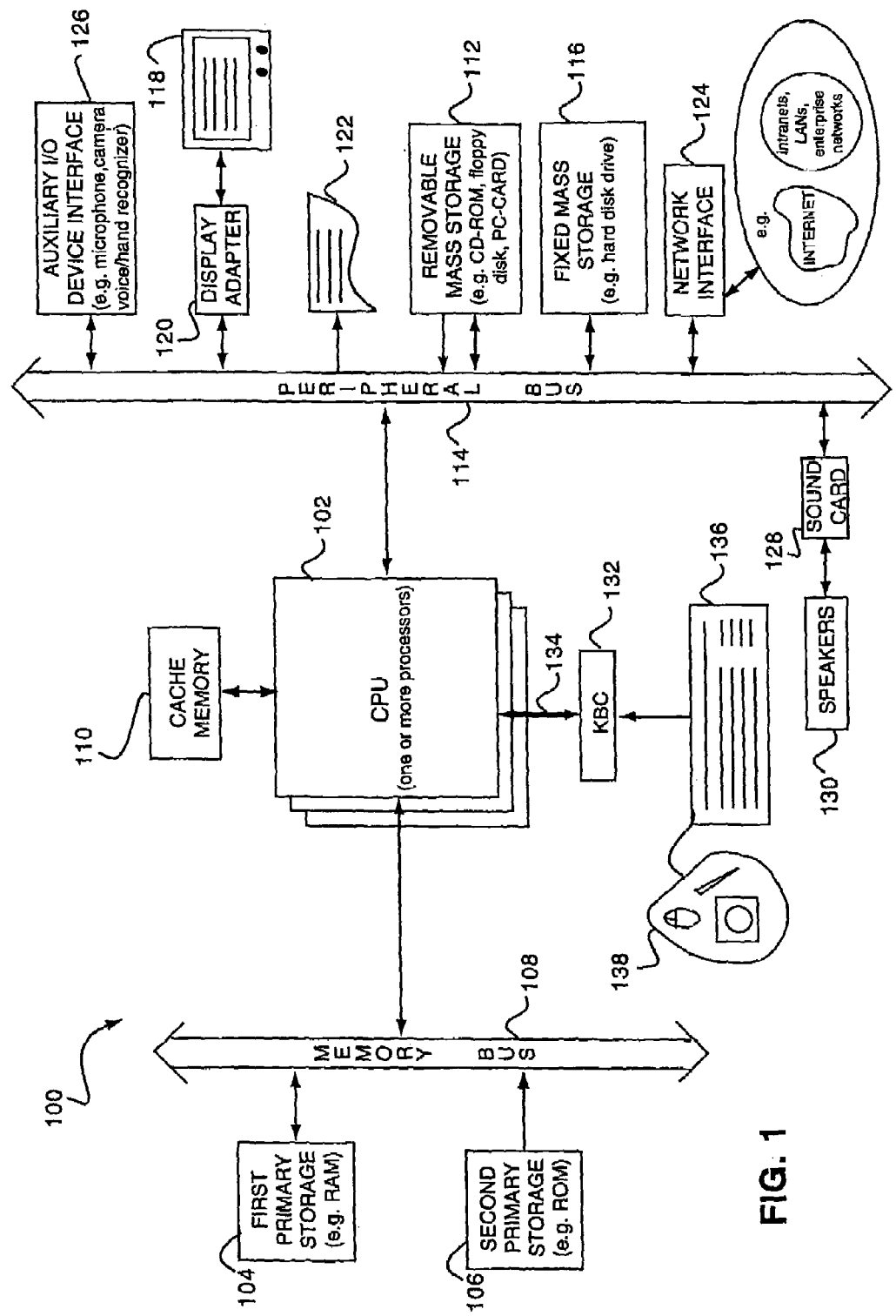
FIG. 1 is a block diagram of a computer system suitable for implementing the present invention.
Figure 2:
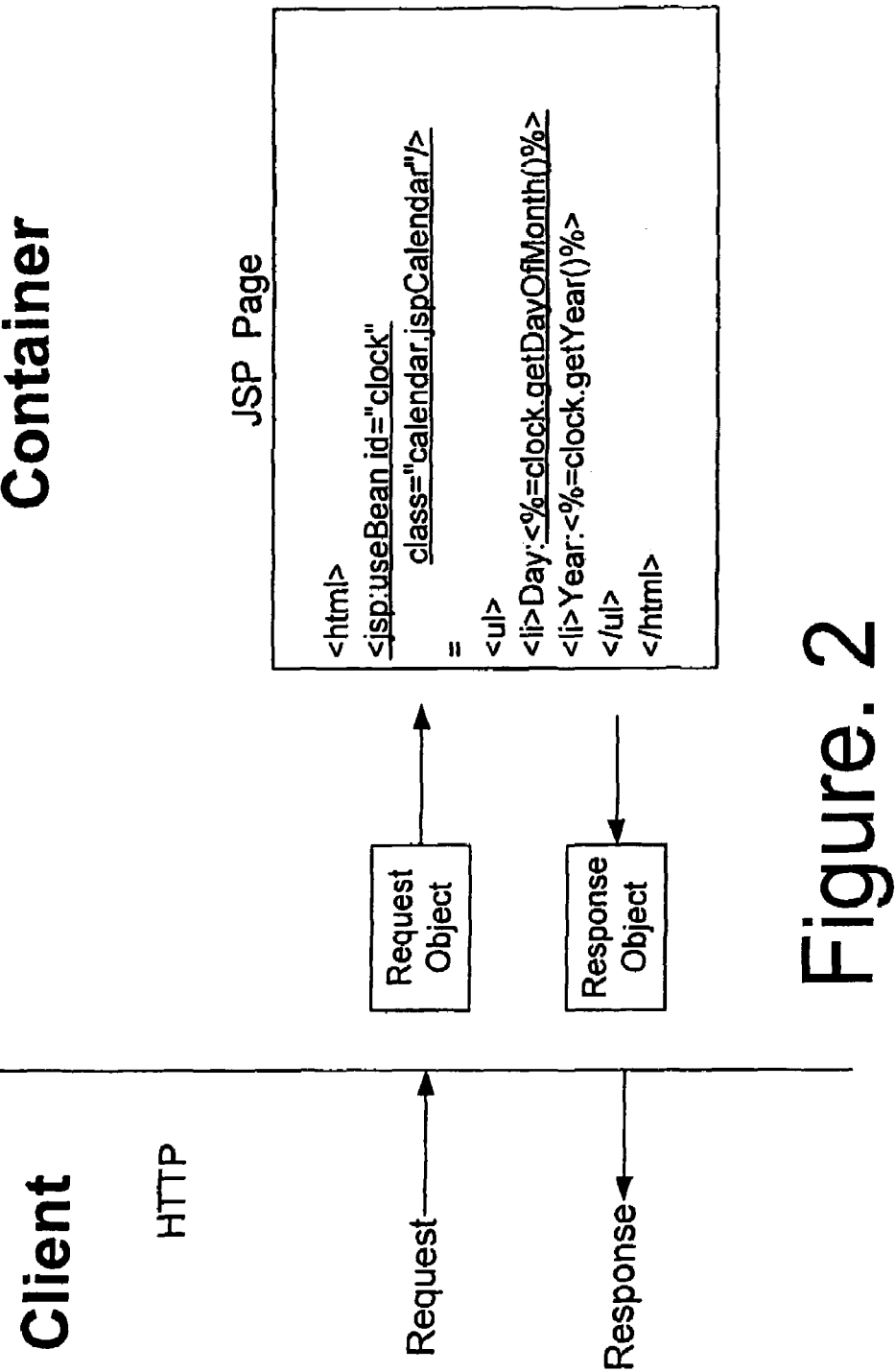
FIG. 2 illustrates a JSP page.
Figure 3:
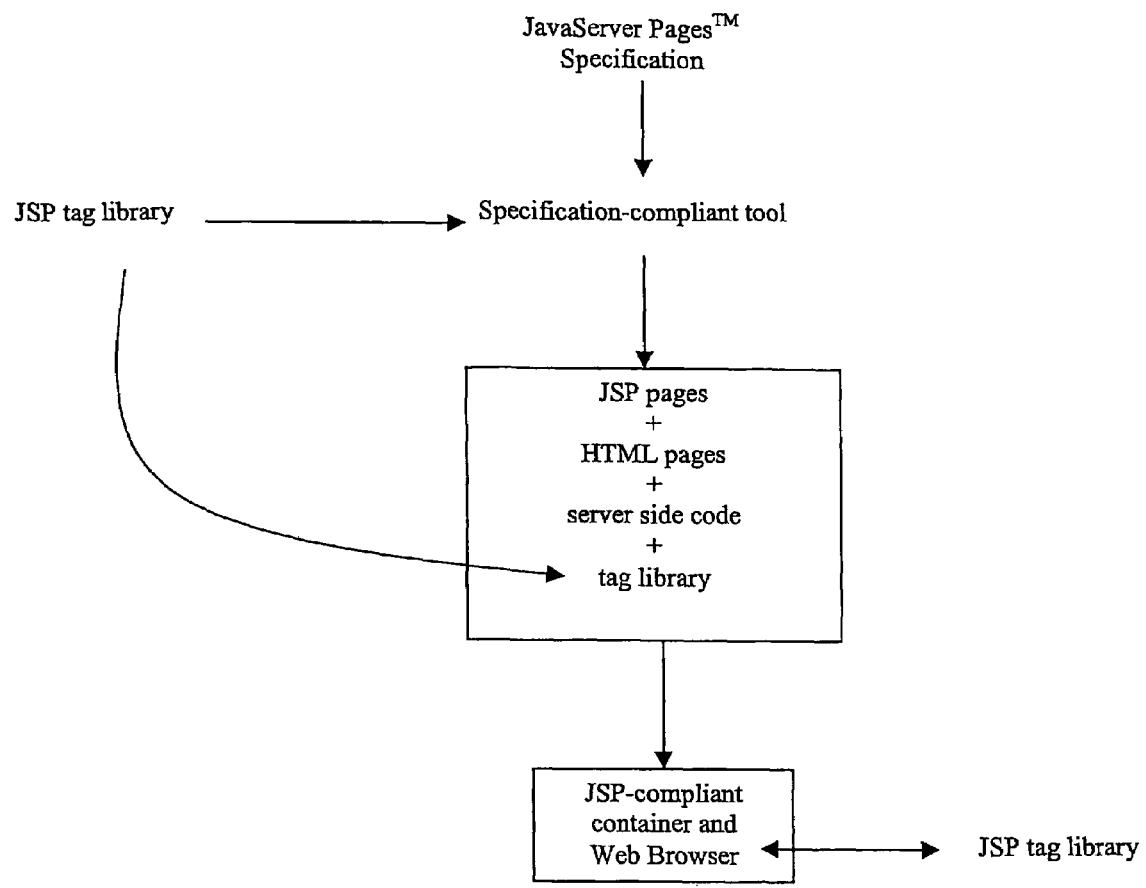
FIG. 3 is a diagram illustrating the relationship between a tag library, a JSP page, and a Web browser.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. It should be noted that in re-configurable computing systems, CPU 102 can be distributed amongst a group of programmable logic devices. In such a system, the programmable logic devices can be reconfigured as needed to control the operation of computer system 100. In this way, the manipulation of input data is distributed amongst the group of programmable logic devices. CPU 102 is a general purpose digital processor which controls the operation of the computer system 100. Using instructions retrieved from memory, the CPU 102 controls the reception and manipulation of input data, and the output and display of data on output devices.

CPU 102 is coupled bi-directionally with a first primary storage 104, typically a random access memory (RAM), and uni-directionally with a second primary storage area 106, typically a read-only memory (ROM), via a memory bus 108. As is well known in the art, primary storage 104 can be used as a general storage area and as scratch-pad memory, and can also be used to store input data and processed data. It can also store programming instructions and data, in the form of data objects, in addition to other data and instructions for processes operating on CPU 102, and is used typically used for fast transfer of data and instructions in a bi-directional manner over the memory bus 108. Also as well known in the art, primary storage 106 typically includes basic operating instructions, program code, data and objects used by the CPU 102 to perform its functions. Primary storage devices 104 and 106 may include any suitable computer-readable storage media, described below, depending on whether, for example, data access needs to be bi-directional or uni-directional. CPU 102 can also directly and very rapidly retrieve and store frequently needed data in a cache memory 110.

A removable mass storage device 112 provides additional data storage capacity for the computer system 100, and is coupled either bi-directionally or uni-directionally to CPU 102 via a peripheral bus 114. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 116 also provides additional data storage capacity and is coupled bi-directionally to CPU 102 via peripheral bus 114. The most common example of mass storage 116 is a hard disk drive. Generally, access to these media is slower than access to primary storages 104 and 106.

Mass storage 112 and 116 generally store additional programming instructions, data, and the like that typically are not in active use by the CPU 102. It will be appreciated that the information retained within mass storage 112 and 116 may be incorporated, if needed, in standard fashion as part of primary storage 104 (e.g. RAM) as virtual memory.

In addition to providing CPU 102 access to storage subsystems, the peripheral bus 114 is used to provide access other subsystems and devices as well. In the described embodiment, these include a display monitor 118 and adapter 120, a printer device 122, a network interface 124, an auxiliary input/output device interface 126, a sound card 128 and speakers 130, and other subsystems as needed.

The network interface 124 allows CPU 102 to be coupled to another computer, computer network, or telecommunications network using a network connection as shown. Through the network interface 124, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 124.

Auxiliary I/O device interface 126 represents general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 102 is a keyboard controller 132 via a local bus 134 for receiving input from a keyboard 136 or a pointer device 138, and sending decoded symbols from the keyboard 136 or pointer device 138 to the CPU 102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 108, peripheral bus 114, and local bus 134 are illustrative of any interconnection scheme serving to link the subsystems. For example, a local bus could be used to connect the CPU to fixed mass storage 116 and display adapter 120. The computer system shown in FIG. 1 is but an example of a computer system suitable for use with the invention. Other computer architectures having different configurations of subsystems may also be utilized.

As the term is used herein, a tag extension mechanism is a specialized sub-language that enables the addition of new or custom actions, thus allowing the JSP "language" to be easily extended in a portable fashion. A typical example would be elements to support embedded database queries. Tag libraries can be used by JSP authors or JSP authoring tools and can be distributed along with JSP pages to any JSP container, such as Web and application servers. The tag extension mechanism of the present invention can be used from JSP pages written using any valid scripting language, although the mechanism itself only assumes a JAVA programming language RunTime environment.

In general, custom actions provide access to their attribute values and to their body. They can also be nested and their bodies can include scripting elements. For example:

<foo attr1="val1" attr2="val2" . . . >
[Body]
</foo> where "Body" may itself have scripting elements or other actions that create or manipulate server side objects.

In order to provide an extensible multi-lingual tag mechanism, the present invention implements a mechanism similar to a closure, but using three separate and distinct methods. Under the closure approach, an object on the server side is created that corresponds to a closure, and then the closure is passed to the semantics of the tag, which then invokes a closure. In the present invention, a tag handler, which is the run-time representation of a custom action, has three new methods:

doStart ( )
doBody ( )
doEnd ( )

In other words, the "doIt ( )" method of the closure approach is split into three parts, which can be implemented in JAVA programming language (unlike a true closure). The key idea is that an implementation of an action provides a method for start tag, a method for end tag, and a method for body. The three methods interact in a simple way with the page implementation so that the details of the page implementation, including details on how to implement the scripting language, reside in the page.

In particular, the doStart ( ) method is first invoked with attribute value data. It returns a BOOLEAN value indicating if the body needs to be evaluated. The body is evaluated as a stream of bytes, into an abstraction, known as a BodyEvaluation object. The BodyEvaluation object is then passed into the doBody ( ) method. The doBody ( ) method returns true if more body evaluations are needed. When no more body evaluations are needed, the doEnd ( ) method is evaluated last.

Thus, rather than creating the complex "closure" abstraction that corresponds to the body, the present invention "in-lines" the evaluation of the body. As shown in FIG. 5, the doStart ( ) method processes the start tag and determines if the body needs to be evaluated. If so, a body evaluation buffer is passed to the doBody ( ) method for body evaluation. The doBody ( ) method may be evaluated many times using a different buffer. Once the body evaluation is complete, the doEnd ( ) method completes the processing.

If a closure were used, one would have to pass the capability of evaluating the body, i.e. create an abstraction that is capable of evaluating body as many times as needed. The code must generally be taken out of order (context). This abstraction is generally very difficult to create, and not really possible using JAVA programming language code. The present invention, however, does not require the creation of the closure abstraction. As shown in FIG. 6, the code of FIG. 4 can be translated using the present invention into JAVA programming language code, without using a closure.

For the present application, the full power and flexibility of a closure is not required. Note that unlike a closure, the mechanism of the present invention does not require any external context information. The scripting details of the present invention match any nesting of the action, so that the structure corresponding to the original scripting is preserved and the present invention works regardless of the scripting language used. In the present invention, only a body evaluation buffer is needed, and buffers are universally supported.

In one embodiment, the JSP page implementation instantiates (or reuses) a tag handler object for each action in the JSP page. This handler object is a JAVA programming language object that implements the javax.servlet.jsp.tagext.Tag interface. In many cases, the action element has an empty body (no text between the start and the end tag). In this common case, the tag handler's method doStart ( ) is invoked, passing in the values for the attributes to the action and a pageContext object. The pageContext object encapsulates implementation dependent features and provides convenience methods, such as getter methods to obtain references to various request-time objects. The doStart ( ) method then performs the desired action. The pageContext object provides access to all the implicit objects (including the request object, for instance) to the handler.

When a custom tag introduces some new identifiers, a javax.servlet.jsp.tagext.TagExtraInfo object is involved at JSP translation time (not at request-time). This object indicates the names and types of the scripting variables that will be assigned objects (at request time) by the action. The only responsibility of the tag author is to indicate this information in the TagExtraInfo object. The corresponding Tag object must add the objects to the pageContext object. It is the responsibility of the JSP translator to automatically supply all the required code to do the "synchronization" between the pageObject values and the scripting variables.

In general, the body of an action may contain other custom and core tags and scripting elements, as well as uninterpreted template text. If an action element has a non-empty body, two additional methods need to be implemented by the tag handler object. Recall that the doStart ( ) method is always invoked first. This method actually returns a BOOLEAN value that indicates whether the body of the action should be evaluated or not. If so, the body is evaluated into a nested stream that is abstracted as a BodyEvaluation object, then the doBody ( ) method of the tag handler object is invoked with the BodyEvaluation object.

The doBody ( ) method also returns a BOOLEAN value. In this case, the value indicates whether the JSP page should do further reevaluations of the body text. Note that since server-side objects (accessible via pageContext, or through nested handlers) may have changed, each evaluation may produce very different content for the BodyEvaluation object. When no additional body evaluations are needed, a final doEnd ( ) method is invoked. Like the doStart ( ) method, the doEnd ( ) method provides synchronization actions between the pageContext data and the scripting variables in the JSP page.

The following examples are provided to further explain the operation of the present invention.

Call Functionality, No Body

<foo att1=" . . . " att2=" . . . " att3=" . . . "/>

In this case, a FooTag tag handler would be defined that implements the Tag interface with null methods for doBody( ) and doEnd ( ). The doStart ( ) method would take the attribute value information, interact with the pageContext data, and invoke into the appropriate functionality. In this example, no TagExtraInfo information is needed as the action defines no objects accessible to the scripting variables.

Call Functionality, No Body, Define Object

<foo id="myfoo" att1=" . . . " att2=" . . . "/>

After this, an object with name "myfoo" is available to the scripting language. The type of the object is provided by the TagExtraInfo for "foo." This example is similar to the previous one, except that the doStart ( ) method inserts the appropriate object for the "myfoo" entry.

Iteration
```
<ul>
<foreach iterate="row" in="balances">
<li>The balance for
account <%=row.getAccount ( ) %> is <%=row.getBalance ( ) %>
</foreach>
</ul>
```

The foreach element does not define a new object for later use but it defines (and redefines) a "row" object that is accessible within its start and end tags. The implementation of this tag requires the repeated evaluation of the body of the tag.

Tag.doStartTag( ) This method extracts the value of the "in" and iterates the attribute values. The value of in ("balances" in this example) is used to get at the result data. The value of iterate ("row" in this example) is used as the key on which to store the iteration value. The current value of the "out" variable is stored away so it can be used in doBody( ).

This method returns true so as to force the evaluation of the body. The translation-time information (TagExtraInfo) indicates that this start tag introduces a scripting variable of name "row".

Tag.doBody( ) The BodyEvaluation that is passed in represents the evaluation of the body of the element where the evaluation has been done in a context where the variable "row" is assigned the different rows of the query. This method takes that EvaluationBody and inserts it into the "out" stream that we had saved aside previously.

Tag.doEndTag( ) The only thing that needs to be done is some bookkeeping.

TagExtraInfo Provides translation-time information. In this case, a new scripting variable is declared within the tag but no variables are available after the end tag.

In further detail, a typical action is of the form:

<bar id="myBar" foo="one">
body
</bar>

The semantics is carried through a JAVA programming language object. This object implements the Tag interface, which has three methods:

doStartTag ( ) The instance is passed attribute values. The Tag instance can use this data to perform any action it may want.

At the end of this action some scripting variables may be assigned from the pageContext object, as indicated in the TagExtraInfo data. This method returns an indication of whether the body of the action should be evaluated; if so, doBody ( ) will be invoked, otherwise doEndTag( ) will be invoked.

doBody ( ) This method is passed a Stream abstraction (i.e. Body evaluation buffer) that corresponds to the tag body. The Tag instance can use this abstraction to insert the data into another Stream, or it can convert it into a String. This method returns an indication of whether the body should be reevaluated. Depending on TagExtraInfo values, the JSP container will resynchronize some variable values (so a reevaluation of the body will return a different value).

doEndTag ( ) This method is invoked after no more doBody( ) method evaluation arc requested. This gives the Tag handler a last chance to perform cleanup and also the opportunity to update the pageContext object. After this method, the JSP container will update scripting variables as indicated by the TagExtraInfo data.

In an alternate embodiment, the doStart ( ) method may return an integer instead of a BOOLEAN. For example a "0" may be used to skip the body evaluation, a "1" may be used to require a body evaluation, etc. The doBody ( ) method may also be broken into two separate methods: doInit Body ( ) and doAfterBody ( ). The doInitBody ( ) preprocesses the BodyEvaluation buffer before the first evaluation (i.e. only happens once). Then the doAfterBody ( ) method functions much like the standard doBody ( ) method discussed above. The doEnd ( ) method can likewise return a value to either skip the processing of the reset of the page (i.e. if an error occurred) or to continue processing the page. Also, instead of passing in attribute values, a JAVA BEAN computer program mechanism may be used to set the variable values.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of processing a custom action tag in a Web Page to provide a tag library extension that can be used to implement a tag library supporting multiple scripting languages, said custom action tag providing textual instructions for performing actions in said Web Page, said custom action tag being capable of customization to perform customized actions and including a start-tag and an end-tag, said custom action tag being further capable of having a body between said start-tag and said end-tag, said method comprising;
   providing, for said custom action tag, a tag-handler object that represents a run-time representation of said custom action tag, said tag-handler object including:
      a do-start method for processing said start-tag of said custom action tag,
      a do-body method for processing said body of said custom action tag, and
      a do-end method for processing of said end-tag of said custom action tag;
   invoking said do-start method of said tag-handler object to process said start-tag of said custom action tag, wherein said do-start method determines:
      whether the custom action tag has a body, and
      whether there is a need to process said body when said do-start method determines that said custom action tag has a body;
   invoking said do-body method of said tag-handler object when said invoking of said do-start method determines that there is a need to process said body of said custom action tag;
   processing, by said do-body method of said tag-handler object, said body of said custom action tag, to translate said body from a first scripting language to platform independent code that can be executed to perform actions intended by said custom action tag;
   determining by said do-body method of said tag-handler object whether further processing is required to translate the body from a first scripting language to platform independent code that can be executed to perform the actions intended by said custom action tag when said processing has been performed by said do-body method of said tag-handler object,
   repeating said processing, by said do-body method of said tag-handler object, when said do-body method of said tag-handler object determines that further processing is required; and
   invoking said do-end method of said tag-handler object when said do-body method determines that no further processing is required, wherein said do-end method processes said end-tag of said custom action tag.

2. A method as recited in claim 1, wherein said method further comprises:
   creating at runtime when said platform independent code is to be executed, by said tag-handler, one or more objects that said Web Page requires;
   storing at runtime when said platform independent code is to be executed, by said tag-handler at runtime, said one or more created objects into a pageContext object, thereby allowing the one or more objects to be retrieved at runtime.

3. A method as recited in claim 1,
   wherein said invoking of said do-start method of said tag-handler object provides said do-start method with one or more attribute values associated with said custom action tag, and
   wherein said method further comprises:
      providing a page context object that provides runtime data including run-time values for one or more attributes associated with said custom action tag; and
      interacting, by said do-start method, with said page context object to perform appropriate functionality with respect to said attribute values.

4. A method as recited in claim 1, wherein said processing of said custom action tag by said do-body method comprises:
   evaluating said body of said custom action tag as a stream of bytes that can be represented as a body-evaluation object, said body-evaluation object providing an abstraction from various scripting languages that can be used to implement said custom action tag.

5. A method as recited in claim 4, wherein a body-evaluation object is implemented using a buffer.

6. A method as recited in claim 4, wherein said evaluating of said custom action tag by said do-body method further comprises:
   providing said do-body method with said body-evaluation object;
   determining by said do-body method whether to insert said stream of bytes into another stream of bytes;
   inserting, by said do-body method, said stream of bytes into another stream of bytes, when said do-body method determines that said stream of bytes should be inserted into another stream of bytes; and
   converting, by said do-body method, said stream of bytes to a string when said do-body method determines that said stream of bytes should not be inserted into another stream of bytes.

7. A method as recited in claim 6, wherein said do-end method:
   facilitates cleanup and update of said context page; and
   determines whether further processing is required for another custom action tag.

8. A method as recited in claim 1, wherein the do-body method of said tag-handler object comprises:
   a do-init-body method that operates to initialize and pre-process a body-evaluation object that provides an abstraction from a scripting language used to implement said custom action tag; and
   a do-after-body method the operates to evaluate said body-evaluation object at least once to translate the body from a first scripting language to platform independent code that can be executed to perform the actions intended by said custom action tag.

9. A method as recited in claim 1, wherein said Web Page is implemented on a server that supports a platform independent programming language.

10. A computer readable storage medium including computer program code for processing a custom action tag in a Web Page to provide a tag library extension that can be used to implement a tag library supporting multiple scripting languages, said custom action tag providing textual instructions for performing actions in said Web Page, said custom action tag being capable of customization to perform customized actions and including a start-tag and an end-tag, said custom action tag being further capable of having a body between said start-tag and said end-tag, said readable media comprising;

computer program code for providing, for said custom
action tag, a tag-handler object that represents a run-
time representation of said custom action tag, said
tag-handler object including:
  a do-start method for processing said start-tag of said
    custom action tag,
  a do-body method for processing said body of said
    custom action tag, and
  a do-end method for processing of said end-tag of said
    custom action tag;
computer program code for invoking said do-start method
  of said tag-handler object to process said start-tag of
  said custom action tag, wherein said do-start method
  determines:
    whether the custom action tag has a body, and
    whether there is a need to process said body when said
      do-start method determines that said custom action
      tag has a body;
computer program code for invoking said do-body
  method of said tag-handler object when said invoking
  of said do-start method determines that there is a need
  to process said body of said custom action tag;
computer program code for processing, by said do-body
  method of said tag-handler object, said body of said
  custom action tag, to translate said body from a first
  scripting language to platform independent code that
  can be executed to perform actions intended by said
  custom action tag;
computer program code for determining by said do-body
  method of said tag-handler object whether her process-
  ing is required to translate the body from a first script-
  ing language to platform independent code that can be
  executed to perform the actions intended by said cus-
  tom action tag when said processing has been per-
  formed by said do-body method of said tag-handler
  object,
computer program code for repeating said processing, by
  said do-body method of said tag-handler object, when
  said do-body method of said tag-handler object deter-
  mines that further processing is required; and
computer program code for invoking said do-end method
  of said tag-handler object when said do-body method
  determines that no further processing is required,
  wherein said do-end method processes said end-tag of
  said custom action tag.

11. A computer readable storage medium as recited in claim 10,
  wherein said invoking of said do-start method of said
    tag-handler object provides said do-start method with
    one or more attribute values associated with said cus-
    tom action tag, and
  wherein said computer readable medium further com-
    prises:
    computer program code for providing a page context
      object that provides runtime data including run-time
      values for one or more attributes associated with said
      custom action tag; and
    computer program code for interacting, by said do-start
      method, with said page context object to perform
      appropriate functionality with respect to said
      attribute values.

12. A computer readable storage medium as recited in claim 10, wherein said processing of said custom action tag by said do-body method comprises:
  evaluating said body of said custom action tag as a stream
    of bytes that can be represented as a body-evaluation
    object, said body-evaluation object providing an
    abstraction from various scripting languages that can be
    used to implement said custom action tag.

13. A computer readable storage medium as recited in claim 12, wherein the body-evaluation object is imple-mented using a buffer.

14. A computer readable storage medium as recited in claim 13, wherein said evaluating of said custom action tag by said do-body method further comprises:
  providing said do-body method with said body-evaluation
    object;
  determining by said do-body method whether to insert
    said stream of bytes into another stream of bytes;
  inserting, by said do-body method, said stream of bytes
    into another stream of bytes, when said do-body
    method determines that said stream of bytes should be
    inserted into another stream of bytes; and
  converting, by said do-body method, said stream of bytes
    to a string when said do-body method determines that
    said stream of bytes should not be inserted into another
    stream of bytes.

15. A computer system for processing a custom action tag in a Web Page to provide a tag library extension that can be used to implement a tag library supporting multiple scripting languages, said custom action tag providing textual instruc-tions for performing actions in said Web Page, said custom action tag being capable of customization to perform cus-tomized actions and including a start-tag and an end-tag, said custom action tag being further capable of having a body between said start-tag and said end-tag, said computer system comprising;
  at least one central processing unit;
  memory; and
  a computer program operating on said at least one central
    processing unit, wherein said computer program is
    capable of:
    providing, for said custom action tag, a tag-handler object
      that represents a run-time representation of said custom
      action tag, said tag-handler object including:
      a do-start method for processing said start-tag of said
        custom action tag,
      a do-body method for processing said body of said
        custom action tag, and
      a do-end method for processing of said end-tag of said
        custom action tag;
    invoking said do-start method of said tag-handler object
      to process said start-tag of said custom action tag,
      wherein said do-start method determines:
      whether the custom action tag has a body; and
      whether there is a need to process said body when said
        do-start method determines that said custom action
        tag has a body;
    invoking said do-body method of said tag-handler object
      when said invoking of said do-start method determines
      that there is a need to process said body of said custom
      action tag;
    processing, by said do-body method of said tag-handler
      object, said body of said custom action tag, to translate
      said body from a first scripting language to platform
      independent code that can be executed to perform
      actions intended by said custom action tag;
    determining by said do-body method of said tag-handler
      object whether further processing is required to trans-
      late the body from a first scripting language to platform
      independent code that can be executed to perform the
      actions intended by said custom action tag when said
      processing has been performed by said do-body method
      of said tag-handler object;

repeating said processing, by said do-body method of said tag-handler object, when said do-body method of said tag-handler object determines that further processing is required; and invoking said do-end method of said tag-handler object when said do-body method determines that no further processing is required, wherein said do-end method processes said end-tag of said custom action tag.

16. A computer system as recited in claim 15, wherein said Web Page is implemented on a server that supports a platform independent programming language.

* * * * *